UNITED STATES PATENT OFFICE.

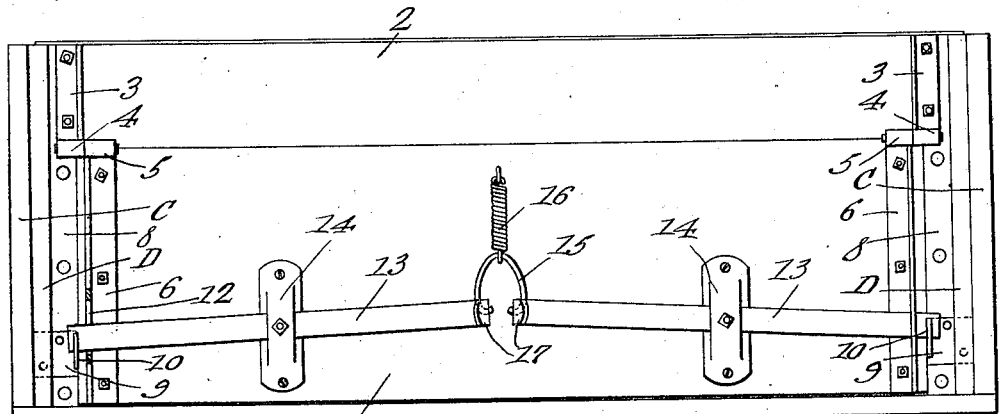
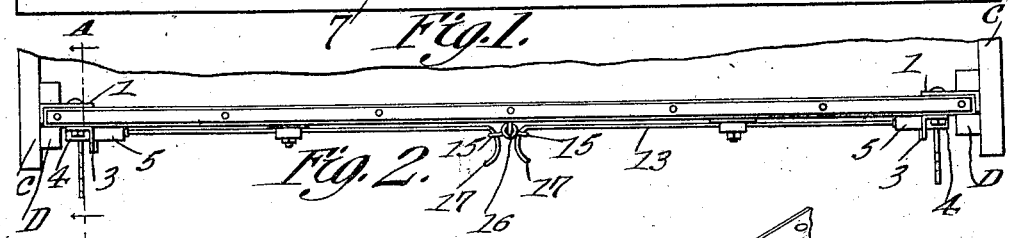
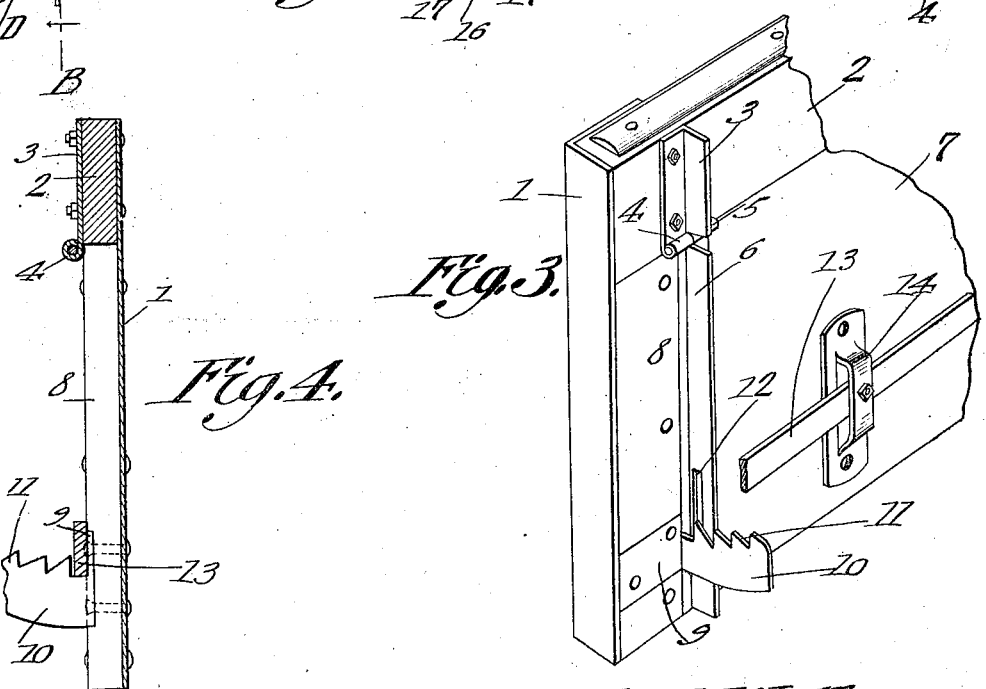

ELMER J. WELLS, OF NASHUA, IOWA, ASSIGNOR OF ONE-HALF TO ALOIS TEGELER, OF NASHUA, IOWA.

END-GATE.

1,178,768.   Specification of Letters Patent.   Patented Apr. 11, 1916.

Application filed October 1, 1914. Serial No. 864,495.

*To all whom it may concern:*

Be it known that I, ELMER J. WELLS, a citizen of the United States, residing at Nashua, in the county of Chickasaw and State of Iowa, have invented a new and useful End-Gate, of which the following is a specification.

This invention relates to end gates for wagon boxes, more especially boxes of that type used for conveying grain. Wagon boxes of this type have heretofore been provided with shovel boards at their rear ends but, as grain elevators are coming into general use by farmers, it has been found inconvenient to unload grain where the boxes are provided with these old types of shovel boards. This is due to the fact that in unloading a wagon box into an elevator, the front end of the box is raised so that the grain will run out of the back end of the wagon box and into the hopper of the elevator. An ordinary shovel board is undesirable under these conditions.

One of the objects of the present invention is to provide a wagon box with an end gate which can be swung upwardly so as to allow grain or other material to flow out of the wagon box when the front end of the box is raised, the size of the stream thus discharged being controlled by the end gate.

Another object is to provide an end gate with improved means for holding it in closed position and which means will not rattle while the wagon is in motion.

A further object is to provide means whereby the end gate can be held at any desired angle when out of its normal position, thus to regulate the size of the stream flowing from the box during the unloading operation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a rear elevation of a wagon box having the present improvements combined therewith. Fig. 2 is a plan view of the end gate and the adjacent portions of the wagon box. Fig. 3 is a perspective view of one end portion of the end gate. Fig. 4 is a section on line A—B Fig. 2, said section being on an enlarged scale.

Referring to the figures by characters of reference C designates the side boards of an ordinary wagon box, the same being provided with cleats D such as commonly used for engaging and holding the end portions of an end gate. The end gate used in connection with the box includes oppositely disposed angle strips 1 forming the ends of the gate, these strips being connected at their upper ends by a top strip 2 formed of wood or other suitable material, the flanges of the angle strips 1 lapping the ends of the strip 2 so as to protect the said ends from wear and to constitute wear surfaces for engaging the side boards of the wagon box. Secured to the rear face of the strip 2 adjacent each end is an angle strip 3, the lower end portion of which is shaped to form a hinge member 4. Each of these hinge members 4 is connected to another hinge member 5 formed at the upper end of an angle strip 6 which is secured to the rear face of the movable section 7 of the end gate, these angle strips 6 being located close to the sides of the section 7 and the space between the sides of said section and between the angle strips 1 being closed normally by side strips 8 secured to the angle strips 1 and abutting against the strip 2. Thus it will be seen that the section 7 forms a hinged gate which, when closed, fits snugly against the lower edge of the strip 2 and the inner side edges of the side strips 8. A plate 9 is secured to the lower end portion of each side strip 8 and has an outstanding arm 10 disposed close to the path of the section 7, the upper edge of each arm 10 being toothed, as shown at 11.

A slot 12 is formed within each of the angle strips 6 and each of these slots is adapted to receive a lever 13. The two levers are fulcrumed within brackets 14 secured to the section 7 and said levers normally engage the respective arms 10. The said levers extend close to each other and their inner ends are connected to a yoke 15 which, in turn, is engaged by one end of a spring 16, the other end of the spring being attached to the section 7 as shown particularly in Fig. 1. This spring exerts a constant upward pull upon the yoke 15 so that the outer ends of the levers 12 are thus pressed downwardly against the arms 10. The teeth 11 are so positioned that when the section 7 is closed, the innermost tooth on each arm 10 will be engaged by the adjacent lever 13 and the section 7 will thus be secured in closed position. When the section 7 is swung outwardly, it can be held in any one of several positions by placing the levers 13 in engagement with the different teeth 11. The inner ends of the levers 13 are outturned as shown at 17 so as thus to form grips whereby said levers can be actuated by hand whenever desired.

The complete end gate is adapted to take the place of an ordinary end gate, it being placed in position by inserting its ends between the cleats D, as shown in Fig. 2. With the end gate thus located, the contents of the wagon box can be prevented from escaping rearwardly therefrom. When, however, it is desired to discharge the contents of the wagon box, said box is elevated at its front end, as hereinbefore described, after which the inner ends of the levers 13 are pulled downwardly so as to disengage the outer ends thereof from the arms 10. The pressure of the contents of the wagon box against the section 7 will cause said section to swing open and by allowing the levers 13 to move back into engagement with certain of the teeth 11, the extent of this opening movement can be limited so that a stream of material of any predetermined thickness can be caused to flow under the section 7. Importance is attached to the fact that the size of the stream of discharging material can be regulated and it is thus possible to control the discharge and too rapid feeding of material to the elevator is prevented.

The entire end gate is very simple and durable in construction and in view of the fact that it can be quickly substituted for an ordinary end gate, it is designed to place it on the market as an article to be so substituted.

It is to be understood that the strip 2 can be of any width desired. Furthermore the plate 9 and the arm 10 can be made wider so that said arm will act as a guide for grain flowing from the wagon body, said grain being thus kept from pouring out laterally and dropping outside of the hopper of the elevator.

What is claimed is:—

1. The combination with an end gate mounted for swinging movement, of longitudinally slotted angle strips secured to the side portions of the end gate, said strips extending throughout the height of the gate and constituting hinge members, spring controlled levers fulcrumed upon said gate and movably mounted within the slots, relatively fixed toothed members adjacent the ends of the end gate and substantially concentric with the hinge of said gate, a spring secured to said end gate, and a connection between the spring and the inner ends of the levers, said inner ends being outturned to form grips and said spring constituting means for holding the levers normally in engagement with the respective toothed members, said toothed members constituting ratchets.

2. An end gate including opposed angle strips constituting wear elements, a cross strip secured to and connecting the upper end portions of the angle strips and abutting against the side portions of the angle strips, side strips secured to the angle strips and abutting at their upper ends against the cross strip and at their outer ends against the side portions of the angle strips, angle strips secured to the cross strip, a movable section adapted to fill the space between the wear elements and below the cross strip, angle strips upon said section and extending from the top to the bottom thereof, and pivotal connections between the angle strips on the section and the angle strips on the cross strip.

In testimony that I claim the foregoing as my own, I have hereto affixed my signature in the presence of two witnesses.

ELMER J. WELLS.

Witnesses:
E. R. PARCHKE,
C. R. DEXTER.